F. SPALAZZI.
SHIP'S COURSE RECORDING DEVICE.
APPLICATION FILED MAY 28, 1908.

1,094,487.

Patented Apr. 28, 1914.
6 SHEETS—SHEET 4.

F. SPALAZZI.
SHIP'S COURSE RECORDING DEVICE.
APPLICATION FILED MAY 28, 1908.

1,094,487.

Patented Apr. 28, 1914.
6 SHEETS—SHEET 5.

WITNESSES:

INVENTOR,
FRANCESCO SPALAZZI
by
ATTORNEYS.

F. SPALAZZI.
SHIP'S COURSE RECORDING DEVICE.
APPLICATION FILED MAY 28, 1908.

1,094,487.

Patented Apr. 28, 1914.
6 SHEETS—SHEET 6.

WITNESSES
John H. Hoving.
Cornelius Hoving.

INVENTOR
FRANCESCO SPALAZZI
BY Berrigan
ATTORNEY

UNITED STATES PATENT OFFICE.

FRANCESCO SPALAZZI, OF ROME, ITALY.

SHIP'S COURSE-RECORDING DEVICE.

1,094,487.  Specification of Letters Patent.  Patented Apr. 28, 1914.

Application filed May 28, 1908. Serial No. 435,523.

*To all whom it may concern:*

Be it known that I, FRANCESCO SPALAZZI, marine officer, a subject of the King of Italy, residing at No. 34 Via Porta Pinciana, Rome, in the Kingdom of Italy, have invented a new and useful Improvement in Ships' Course-Recording Devices; and I do hereby declare the following to be a full, clear, and exact description of the same.

The present invention refers to an apparatus, which during the movement of a ship automatically records the course of same upon a drawing sheet or even directly upon a sea chart, provided that a suitable drawing scale has been adopted.

This apparatus is very useful on board of warships during maneuvers for obtaining in an easy and reliable manner graphical records of the course of the ships, and also on merchant vessels, particularly when they are navigating in foggy weather. For this purpose the recording apparatus is connected with the compass which transmits to it angular movements corresponding to the angular displacements of the compass or rather corrected angles corresponding to the true course and with the propeller shaft, from which it receives the indication of the way made as estimated from the number of revolutions of the propellers. It will be easily understood that the compass must be provided with contrivances for correcting from the magnetic indications to the true course and for compensating for the deviations due to the iron on board. Therefore, the whole apparatus consists of:—(a) a device which automatically transmits to a distance the corrected angles corresponding to the true course; (b) a calculating device giving the way made as deduced from the number of revolutions of the propeller shaft; (c) the tracing apparatus which also causes the sheet to move. These various parts are hereinafter described and illustrated in the annexed drawings, in which:—

Fig. 1ª is a portion of Fig. 1 showing in addition the rudder as well as a switch controlled by the line current and designed to supply a repeating motor with current. Fig. 3 is a side view, in elevation, of the recording apparatus, several parts being either omitted or broken away, for clearness sake.

Figure 4:
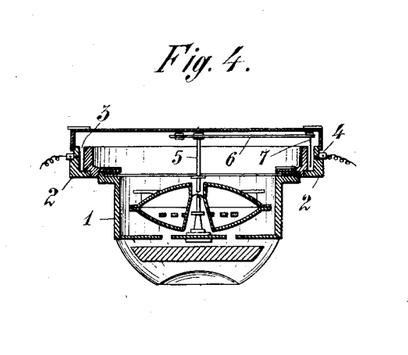
Fig. 4 shows a section of a mariner's compass adapted for working in connection with this apparatus.

The angular displacement of the compass is transmitted by means of an apparatus for repeating angles at distance, to the device for recording the direction. This apparatus can work in connection with a compass of any kind and, therefore, it has to be understood that the compass shown in the drawing (Fig. 4) is only given by way of example and any other compass could be employed for the same purpose. The upper edge of the box —1— of the compass carries a collar —2— of insulating material, which collar is provided with a deep annular groove —3—; points or plates of platinum —4— passed through the walls of the collar reach in the inner part of same the surface of the groove —3—, which is filled with a slightly conducting liquid, for instance pure water containing a few drops of sulfuric acid. The plates or platinum tips are placed all around at equal angular intervals between each other at a distance of a few degrees. In the center of the swimmer of the compass an axis —5— is placed which supports the arm —6—; the arm —6— carries at its free end a pin —7— which dips into the liquid contained in the annular groove —3— and the arm —6— is electrically connected with the axis of suspension of the card. The platinum tips —4— are electrically connected with the coils of an orientation motor. The connection is made in such a way (Figs. 1 and 2) that to one clamp are connected those tips which are distant from each other three places, viz. the first, the fourth and the seventh, that is the tips $4^1$, $4^4$, $4^7$, are connected with the clamp $8^1$, by means of the wire —$9^1$— the second, the fifth and the eighth that is the tips $4^2, 4^5, 4^8$, to the clamp $8^2$, by means of the wire —$9^2$— and so on. The current arrives at the arm —6— and the tip —7— through a wire —10— ending at the axis —5—. The binding posts —$8^1$—$8^2$—$8^3$— communicate electrically to the mercury contained in three cavities —$11^1$—$11^2$—$11^3$—. In the mercury of said cavities dip the edges of three disks —$12^1$—$12^2$—$12^3$— keyed on the shaft —13— of the orientation motor —14—. The fixed field of this motor is formed by two magnetic poles —$15^1$—$15^2$— which can have a series or shunt excitation; between said poles is placed a drum armature with three coils —$16^1$—$16^2$—$16^3$— at 120° from each other and each one of these three coils is electrically connected with one of the metallic disks —$12^1$—$12^2$—$12^3$— mounted upon the shaft —13— of the motor. On the same shaft is mounted a fourth disk —17— to which ends the return wire 107 (Fig. 2) of the motor and the edge of which dips permanently in a cavity —18— filled also with mercury and in communication with a wire —108— which forms the field windings —15'—15"— and ends in a fourth binding-post —19— from which comes out the wire —20— leading again to the generator. When the platinum pin —7— suspended at the arm —6— is displaced and it passes immersed in the liquid from one contact to the other, currents of variable strength are sent into the wires connected with the two contacts between which the pin —7— is placed and the current reaches the highest point when the platinum pin —7— places itself against one of the contact plates —4—; then when the pin gradually moves away approaching the following plate, the current diminishes in the first wire, while it increases in the second and so on, so that when the arm —6— rotates, the resultant flux between two successive coils moves in the same direction causing the armature of the motor to rotate for an equal angle. The current which is caused to circulate in the coils is an alternating current, as otherwise it would produce a decomposition of the liquid contained in the groove —3— and deviations of the compass. It will be however understood that it is not necessary to have the main line fed with alternating current; if direct current circulates in the mains —109—110—, it will be sufficient to provide a dynamo —126— on a branch line —127—128— driving a current inverter —129— of any approved type, connected to the mains by means of the wires —130—131— and in which end the wires —10—20—.

Figure 2:
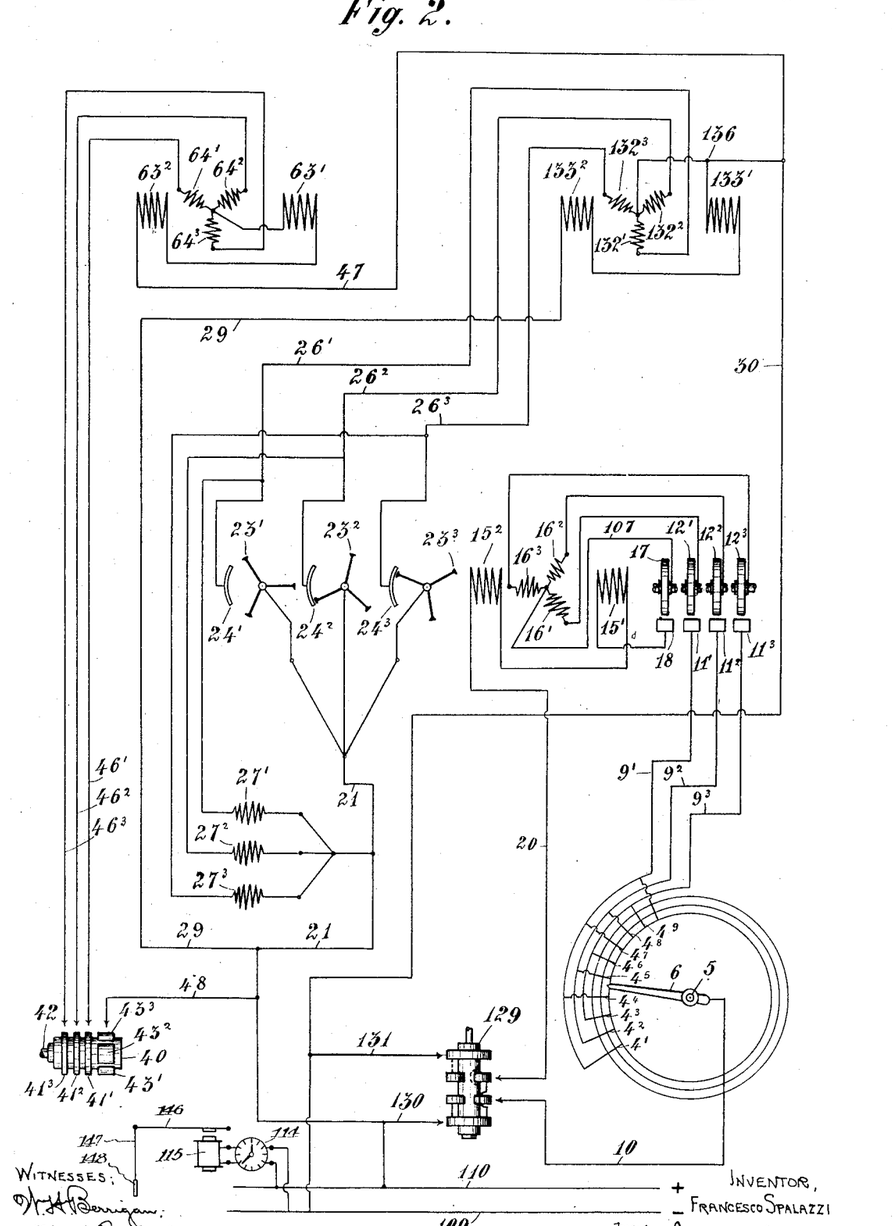
Fig. 2 is a schematic view of the electrical connections.
Figures 5, 10, 11:
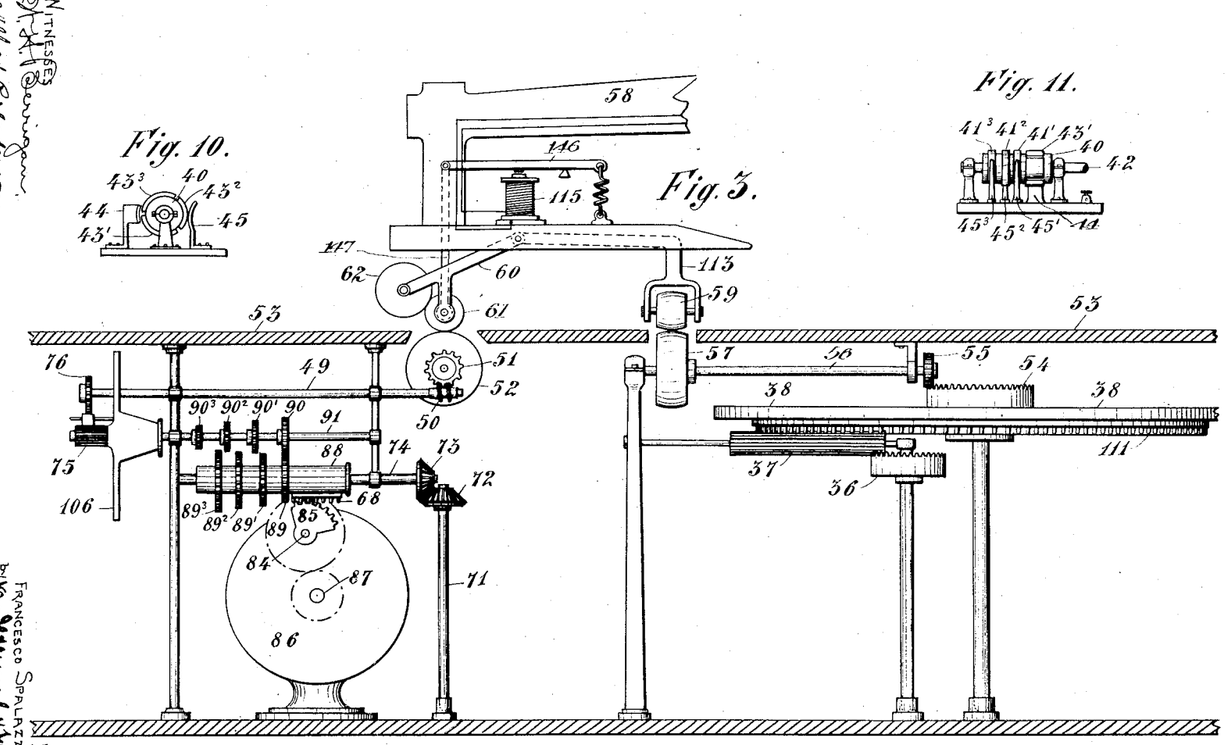
Figs. 5 and 6 are a plan and a perspective view, respectively, of a device for correcting the deviations of the compass produced by the iron on board.
Figs. 10 and 11 are respectively an end view and a side elevation of a commutator used in connection with said motor.
Figure 5:
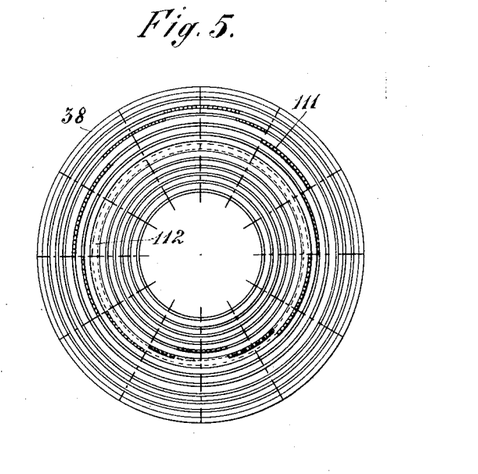
Figure 6:
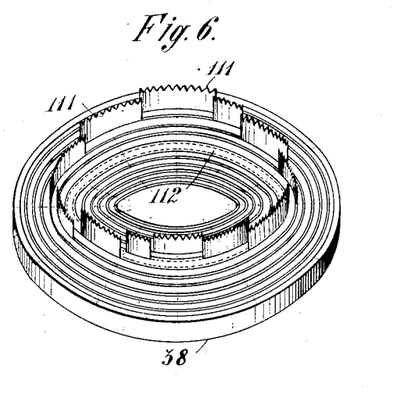

From the foregoing it appears that the armature of the motor —14— performs a complete rotation each time the compass needle is displaced an angular interval comprising three contact plates. The current which produces the rotation of the motor —14— is very feeble, and said motor is utilized as a relay for actuating another motor, allowing the passage of stronger currents, in the recording device. The two motors are connected in the following manner: The current feeding in the receiving motor —33— arrives from the wire —21— electrically connected with three metallic rings —$122^1$—$122^2$—$122^3$— mounted on the shaft —13— of the motor —14— and provided each with three projecting pins —$123^1$—$123^2$—$123^3$— at 120° from each other. Said pins can come in contact with the mercury contained in three cavities —$24^1$—$24^2$—$24^3$—. In the mercury dip also the ends of three binding posts —$25^1$—$25^2$—$25^3$— from which start the wires —$26^1$—$26^2$—$26^3$— leading to the binding posts —$28^1$—$28^2$—$28^3$— of the receiving motor —33—. The binding posts —$28^1$—$28^2$—$28^3$— are connected with brushes —$32^1$—$32^2$—$32^3$— resting against metallic rings provided on the shaft —31— of the motor —33—. The motor —33— is similar to the motor —14—; it has a drum armature with three coils —$132^1$—$132^2$—$132^3$— communicating with the three rings: the excitation —$133^1$—133— is independent and receives the current from the wire —29— ending at the binding post —134—. The return wire is designated by the numeral —30— and starts from the binding post —136— communicating with brush —137— at which ends also the returning wire of the armature. It will be convenient to have non-inductive resistance coils —$27^1$—$27^2$—$27^3$— in shunt with the mercury contacts. The motor —33— will exactly repeat all the movements of the motor —14— in the same manner as the latter repeats the movements of the compass needle, with the difference however that a complete rotation of the motor —14— corresponds to a complete rotation of the motor —33—. It should be remarked that the rings —$122^1$—$122^2$—$122^3$— are rotated —40°— the one in respect to the other, so that, before a pin, —$23^1$— for instance, abandons the mercury contact, a pin —$123^2$— has come in contact with the mercury in the cavity —$24^2$— and thus there is a moment in which the current circulates in two subsequent coils, which insures a more uniform working. Thus the motor —33— rotates through angles corresponding to the angular displacement of the needle of the compass. The motor —33—, by means of the worm —34— and worm wheel —35—, moves the crown wheel —36—, which in its turn engages with the grooved roller —37—; said roller engages with the toothed disk —38— (Figs. 5 and 6). In the surface of said disk are provided concentric grooves and it is also divided radially. In these grooves are inserted toothed segments —111— having all of them the same range of teeth; the grooved roller —37— engages now with one or with other of the said toothed segments. It is obvious that in the case of a determined equal angle of rotation performed by the roller —37—, the disk —38— will carry out a larger rotation, if the roller —37— engages with the segments —111— provided in the grooves lying closest to the center of the disk, and the said disk —38— will perform a smaller rotation when the roller —37— engages with the segments —111— placed in the grooves toward the periphery. In the series of grooves there is the groove —112—, which lies in the intermediate position of the aforesaid grooves, and for which the rotation of the disk —38— corresponds to the normal rotation determined by the deviation of the compass, when the latter is not influenced in any way by the iron on board. Consequently, attention is to be paid to, namely, to the one in which no influence whatever is produced upon any of the rhombs of the compass, and the other in which this influence exists. In the first case it is only necessary to place the toothed ribbon —111— in the groove —112— on its whole circumference, so that at each displacement of the compass a proportional displacement of the toothed ring formed by the ribbon is produced, so that in order to obtain the true direction, it will be sufficient to rotate initially the said disk —38— through the angle of the local declination. If, on the contrary, through the deviation due to the iron on board corrections have also to be made in various rhombs, then the toothed ribbon, instead of being completely inserted into the central groove —112— (which corresponds to the absence of any deviation), should be placed in the various sectors formed by the radial divisions, in some cases in grooves lying outside the central groove and in some cases in grooves located inside said groove according as the correction is to be positive or negative, so that the extent of angular displacement produced by a given rotation of the roller —37— depends on the sector in which it takes place. In this way, when the roller —37— is turned to correspond to the angle of magnetic direction given by the compass, at the toothed ring a displacement corresponding to the true direction is produced.

Figure 1:
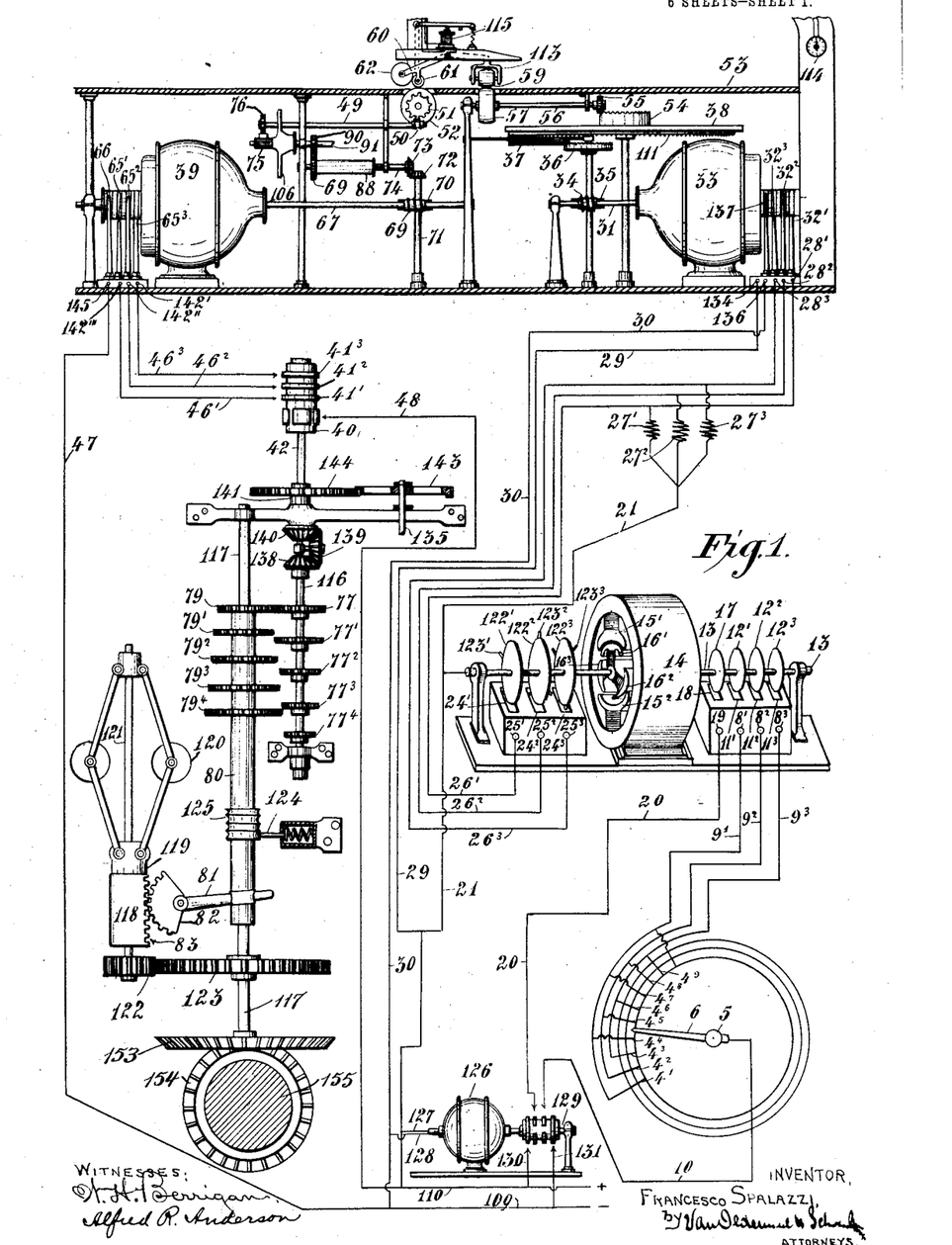
Figure 1 is a general view showing partly in a diagrammatic way the arrangement of the whole apparatus and the connection of its parts.
Figure 1A:
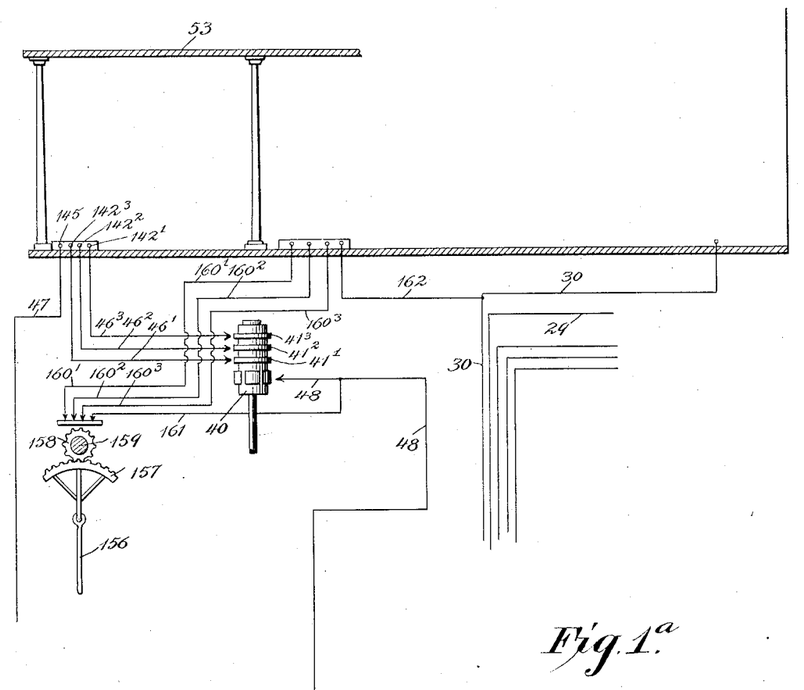
Figure 7:
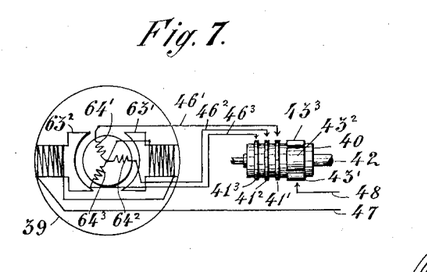
Fig. 7 is a diagrammatic view of the electrical connections in a device for transmitting to a distance the angular movements of a rotating shaft.
Figure 8:
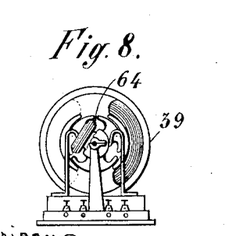
Figs. 8 and 9 are respectively an end view, partially in section, and a side elevation of the motor used in the device shown in Fig. 7.
Figure 9:
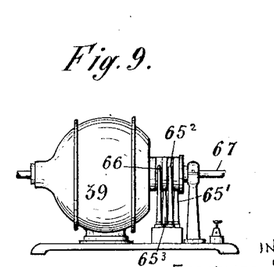

The way made by the ship is, in the device which forms the object of the present invention, computed on the basis of the number of revolutions of the propeller shafts, since the speed of the ship is a function of this number if it moves with uniform speed and if there are no additional resistances due to the wind or to sea currents. The movement of the propeller shaft is transmitted to an electric motor —39—, (Fig. 1) by means of a device for repeating angular movements at a distance, connected with the propeller shaft in such a way that the shaft and the motor revolve through equal angles, in the same manner as the motor —33— repeats the angular movements of the shaft —13—. The motor —39— is exactly like the motor —33—, and comprises a fixed field formed with two magnetic poles —63¹—63²— (Fig. 7) having series excitation and a drum armature with three coils —64¹—64²—64³— at 120° from each other. The switch, Figs. 7, 10 and 11, which produces the variation on the current circulating in the three coils of the armature consists of an insulating cylinder —40— mounted on a shaft —42— which either directly, or by means of suitable transmission mechanisms is connected with the propeller shaft, the angular movements of which are to be transmitted, so that it either turns through the same angle or a proportionally larger or smaller angle according to the circumstances. Upon the insulating cylinder —40— are placed three continuous metallic rings —41¹—41²—41³— and a ring divided into three segments —43¹—43²—43³— each one of which is electrically connected with one of the continuous rings. Against the interrupted ring rests a large brush —44— with which is connected the wire —48—. The contact surface of the brush —44— is smaller than a segment of the ring, but it can lie in contact with two successive segments, so that the brush passes from one segment to the other after having for a certain interval allowed the passage of the current through both segments. When the current to be transmitted has a considerable strength, then in order to diminish the sparking two or more brushes can be used acting on a like number of interrupted rings, the corresponding segments of which communicate with the same continuous ring. Against the three continuous rings —41¹—41²—41³— rest three brushes —45¹—45²—45³— (Fig. 11) from which start the wires —46¹—46²—46³— ending at the binding posts —142′—142″—142‴— which communicate with the brushes —65¹—65²—65³— of the collector of the motor —39—. From the binding post —145— communicating with the fourth brush —66— of the collector of the motor starts the return wire —47—. It will be easily understood that by turning the shaft —42— of the switch the same angular movement is repeated by the shaft —67— of the motor —39— and thus a revolution of 120° is produced each time the brush —44— passes from one segment to the other; however, when the brush begins to cover the successive segment and it has not yet left the preceding one, so that the current circulates in two successive coils, the armature is turned through 60°. The motor —39— drives the transporting roller —52— by means of suitable gearing, for instance, the motor shafts —67— may be provided with a worm —69— engaging with a worm wheel —70— mounted on a shaft —71— which carries at one end a bevel wheel —72— meshing with a bevel wheel —73— mounted on one end of a shaft —74— which by means of a gear described more in detail hereafter transmits the motion to the shaft —49—, the other end of which carries a worm —50— engaging with a worm wheel —51—, which in its turn rotates the transporting roller or carrier —52—, of the recording apparatus the rotation of which is, therefore, proportional to the way made by the ship. This arrangement is shown in Fig. 1, wherein in order to show said arrangement more clearly the gear connecting the two shafts —74—49— and the motor controlling same have been omitted; both of these parts are shown in Fig. 3.

The recording apparatus produces the displacement of the sheet on which the ship's course is recorded by causing it to advance a distance proportional to the way made and by keeping it at the same time always angularly displaced to correspond with the true direction. This apparatus consists of a desk, beneath the surface —53— of which are placed the transporting roller —52—, the rotation of which is proportional to the way made, and the disk —38—, which gives the true direction, or rather the corrected angular displacement of the compass. The disk —38— carries a crown wheel —54— which by means of a pinion —55— transmits the motion to the shaft —56—, on which a displacing roller —57— is mounted. Above the desk is provided a support —58—, to which is fastened an arm 113 carrying a loose roller —59—, which comes into contact with the displacing roller —57—, and an arm —60— which carries a writing roller —61—, whose edge rests against the transporting roller —52— and receives ink by means of an inking device —62—. The sheet of paper on which the ship's course is to be recorded rests upon the surface of the table —53— and is caused to pass between the displacing roller —57— and the pressure roller —59— and between the transporting roller —52— and the writing wheel —61—, care being taken that at the moment when the apparatus is started the point corresponding to the position of the ship to be recorded on the sheet lies at the point of contact between the writing roller —61— and the transporting roller —52—.

Figure 15:
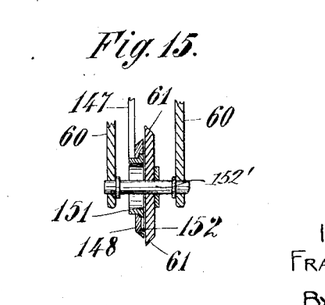

It will be now easily understood how the apparatus works: Assuming that the ship's course is not changed, the disk —38— and the displacing roller —57— remain at rest. The only movement is that of the transporting roller —52—, which caries forward the sheet on which the writing roller —61— traces the line, the sheet being made to slide between the roller —57—59— without imparting motion to the latter. If there is any alteration in the course, the disk —38— rotates causing the displacing roller —57— to revolve which roller in its turn, helped by the upper roller —59—, causes the sheet of paper to rotate around the contact point of the roller —61— with the roller —52—. The diameters of the toothed wheels of the roller and the relative position of same are calculated so that the rotation of the sheet takes place through an angle equal to the deviation of the ship from the original direction. A clock work device —114— acting on an electromagnet —115— marks at given intervals on the line corresponding to the ship's course, dashes or dots by means of which the time corresponding to the various positions of the ship can be easily ascertained. For this purpose the lever —146—, to which is fastened the armature of the electromagnet —115— is articulated to a vertical rod —147— which carries the marking roller —148—. In the position of rest a spring —149— acting on the free end of the lever —146— keeps the roller —148— raised above the drawing sheet —150— and in contact with the inking roller —62—. The rod —147— however does not bear directly the roller —148— which is ring-shaped and mounted loose on a collar —151—, through which passes the axle —152'—, (Fig. 15) whereon is mounted the writing roller —61—. When the electromagnet —115— is energized, the lever —146— is depressed and thereby the marking roller —148— brought in contact with the record sheet —150—. The collar —151— has of course such a diameter as to allow said movement. In order to insure a uniform inking of the marking roller —148— the roller —61— carries a little pin —152— which enters in a radial groove of the roller —148— and carries same together with the writing roller —61— without preventing or hampering the vertical movement that the rod —147— imparts from time to time to the marking roller —148—.

The hereinbefore described apparatus is accurate enough in most cases for giving a true record of the course of the ship, as for instance in the case of ships making long voyages at a constant speed. There are then no other corrections to be introduced except to change the angular displacement of the disk —38— in accordance with the variation of the magnetic declination at the various points occupied by the ship. The effects of leeway due to currents or to the winds are ordinarily of little importance in large fast ships, but they can be easily taken into account by correcting the diagram. If, however, the ship has to follow a tortuous course in which the speed has often to be changed, then the effects of the changes of speed as well as of the resistance of the rudder have to be taken into consideration. Therefore, there are two kinds of correction to be made, which are automatically produced by the devices described hereinafter.

The working of the device hereinbefore described giving the way made by the ship is based on the known ratio between the speed —$v$— of the ship and the number of revolutions —$n$— which the screws make in a minute $$v = k \cdot n.$$

where —$k$— is a numerical coefficient which is assumed as constant. But —$k$— varies in many ships when the speed varies and this variation is to be taken into account. The correction is effected by mounting on the shaft —116— which transmits the motion to the shaft —42— of the rotating switch, Fig. 1, a set of toothed wheels —77—$77^1$—$77^2$—$77^3$—$77^4$ . . . having decreasing diameters and keyed on said shaft, and on a second shaft —117— which by means of gears —153—154— or by any other suitable means receives the motion from the propeller shaft —155— another set of toothed wheels —79—$79^1$—$79^2$—$79^3$ . . . having increasing diameters and mounted on a sleeve —80—. This sleeve turns together, but can be shifted along the shaft —117— by means of a shifting lever —81— extending from a toothed sector —82— which engages a toothed rack —83— provided on the sleeve —118— connected with the collar —119— of a centrifugal governor so that the pair of wheels —77—79— which are engaged varies according to the position of the governor and the ratio of the speed imparted by the shaft —121— of the governor, by means of the toothed wheels —122—123— to the shaft —117— of the shaft —78—, which rotates together with the sleeve —80— accordingly also varies. A spring catch —124— engaging in grooves —125— provided on the surface of the sleeve —80— compels the same to stop always in the proper position for securing the engagement of one of the wheels —79— with one of the wheels —77—. However, if the ship has two engines also the effect of the different speeds of the two engines has to be taken in consideration and this is effected by means of a differential gear inserted between the shaft —116— and the shaft —42— as hereinafter described. The centrifugal governor of the second engine controls, in the same manner as before described for the governor —120—, the speed of a shaft —135—, which carries a cylindrical wheel —143—, engaging with a wheel of the same diameter —144—, mounted on a sleeve —141— loose on the shaft —42—. On the sleeve —141— is mounted also a conical wheel —140— which is in front of a like conical wheel —138— carried by the shaft —116—. To the end of the shaft —42—, which projects from the sleeve —141—, is fastened an arm carrying a loose pinion —139— having the same size as the bevel wheels —140—138— with both of which it engages, when the two wheels turn with equal speeds the pinion —139— is carried between them and rotates at the same speed the shaft —42—, but when the wheels turn with unequal speeds, the pinion —139—, rolls on these wheels either retarding or accelerating by a quantity equal to the semi-difference of the two speeds, so that the shaft —42— turns through an angle which corresponds to the semisum of the speeds. In turning, the resistance of the rudder is perceived and therefore when the motion is transmitted to the transporting roller this fact must be taken into account. The effect of the rudder is easily compensated for by means of an orientation motor —86— (Fig. 3) the shaft —87— of which by turning through an angle proportional to that of the rudder, causes the rotation of a sector —85— which is mounted on a shaft —84—. This arrangement is shown in Fig. 1ª. The rudder —156— by means of gears —157—158— or of any other suitable means controls the movement of a rotating switch —159— similar to those already described and illustrated in Figs. 1, 2, 7, 11, and from said switch start the three wires —160'—$162^2$—$160^3$— which supply the current to the repeating motor —86—. The current arrives to the switch —159— from the main line through a lead —161— branching from the wire —48— and the return from the motor —86— is made through the wire —162— which joins the return wire —30—. The sector —85— engages a rack —68—, and moves a sleeve —88— which turns with the shaft —74— and which carries a set of toothed wheels of different diameters —89—, $89^1$—$89^2$—$89^3$— each of which can engage one of the wheels —90—$90^1$—$90^2$—$90^3$— also having different diameters and keyed on the shaft —91— the motion of which is transmitted, conveniently reduced, to the transporting roller of the recording device.

Figure 12:
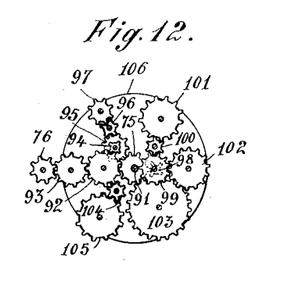
Fig. 12 shows a reducing gear used in the tracing device for changing the scale of the drawing.
Figure 13:
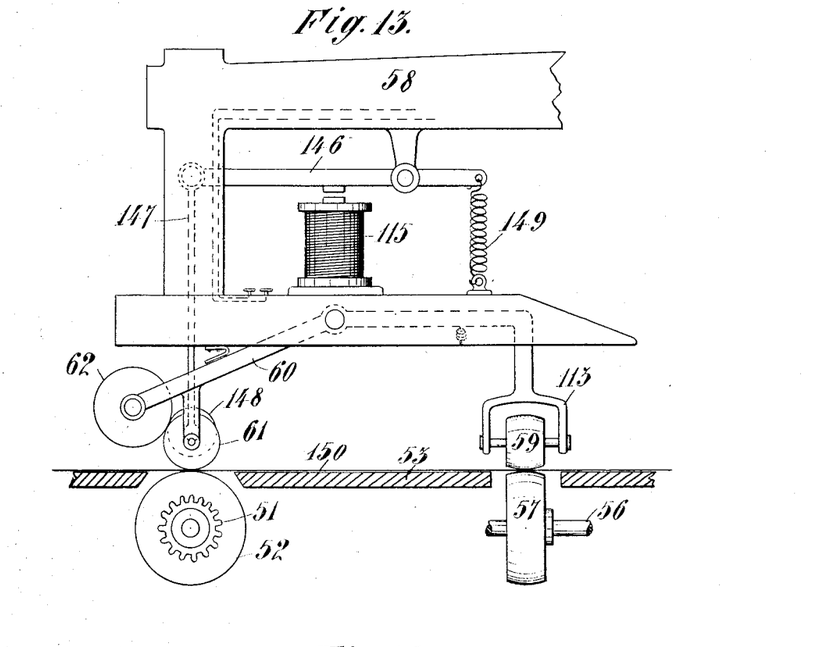
Figs. 13, 14 and 15 are, respectively, side elevation, top view and section detail view of the writing device.
Figure 14:
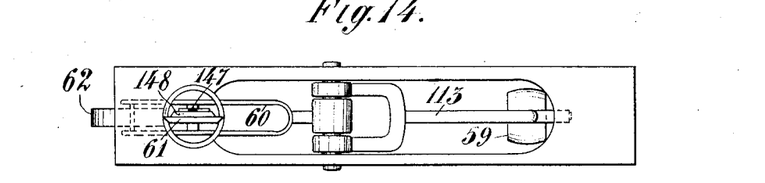

For transforming the motion of the shaft —91— to a motion corresponding to the scale on which the drawing is traced a scale reducer for the scales most frequently in use in sea charts is employed. This consists of a disk —106— (Fig. 12) mounted on the end of the shaft —91—, on which, in the example shown in the drawing, six different scales are provided, represented by the trains of toothed wheels —92—93—; —92—94—95—96—97—; 98—99—100—101—; —98—99—102—; —103—; —92—104—105—; in which trains the first wheel of each set engages the wheel —75— carried by the shaft —91— and the last one, by turning the disk —106—, can be caused to engage the wheel —76— which is mounted on the shaft —49—. Thus by simply rotating this disk the reduction desired for the movement given by the shaft —49— to the roller —52— is established. The angular displacements which are given by the shaft —56— remain unchanged at any scale.

Having now particularly described and ascertained the nature of my said invention, and in what manner the same is to be performed, I declare that what I claim is:

1. An apparatus for automatically recording the course of a ship comprising: a compass, a device for transmitting to a distance the angular movements of said compass, a support for the record sheet lying freely on the desk of the recording apparatus, a deviating roller resting against said sheet and rotated by the device which transmits the angular movements of the compass by angles proportional to the movement of the compass, a device for transmitting to a distance the number of revolutions of a rotating shaft, a propeller shaft operatively connected with said device, a transporting roller operatively connected to said device and rotated by same at a speed proportional to that of the propeller shaft, a writing roller and a pressure roller coöperating respectively with the transporting and the deviating roller in such a way that the record sheet is simply moved forward by the transporting roller passing under the writing roller and between the deviating roller and the pressure roller without moving the two last mentioned rollers, when the ship is moving on a straight course, while each time a change in the direction is made, the deviating roller causes the sheet to rotate around the contact point of the writing roller through a corresponding angle.

2. In an apparatus for automatically recording the course of a ship a device for compensating for the deviations of the compass due to the iron on board, comprising: a compass, a motor the armature of which receives angular displacements proportional to the movements of said compass, a disk divided into sectors and provided with concentric grooves, flexible toothed ribbons inserted in each sector into a groove removed from the central groove to an extent proportional to the value of the deviation in the region corresponding to that sector, so as to form a segmental crown-rack of variable diameter; a cylindrical drum with longitudinal grooves placed radially across said disk and receiving the movement from the motor and transmitting same to the disk by means of the toothed ribbon with which it is always in gear; a deviating roller to rotate the drawing sheet, and suitable connections between the deviating roller and the grooved disk which controls its movement.

3. In an apparatus for automatically recording the course of a ship a device for maintaining at all speeds of the ship the movement of the record sheet proportioned to the way made comprising: a device for transmitting to a distance the number of revolutions of a rotating shaft, a propeller shaft operatively connected with said device, a transporting roller acting on the record sheet, a variable speed gear inserted between the propeller shaft and the device which transmits the number of its revolutions, a centrifugal governor controlling said variable speed gear, and connections between the propeller shaft and the centrifugal governor, so that the gear may automatically be moved into position by the governor for giving the ratio of transmission which corresponds to the speed with which the ship is moving.

4. In an apparatus for automatically recording the course of a ship a device for compensating for the effects of the resistance of the rudder while the ship is moving comprising a device for transmitting to a distance the angular movements of a rotating shaft, a rudder and a variable speed gearing operatively connected to said device so that the ratio of the transmission in the gear is controlled by the position of the rudder, a transporting roller, a propeller shaft and a device imparting to the transporting roller through the above said variable speed gear a speed proportional to the speed of the propeller shaft so that the ratio of the transmission is modified according to the position of the rudder.

5. In an apparatus for automatically recording the course of a ship a device for varying the tracing scale in accordance with the scale of the sea chart on which the record is made, comprising: a propeller shaft, a device for transmitting the number of revolutions of a rotating shaft operatively connected to the propeller shaft, a second shaft rotated by said device at a speed proportional to the speed of the propeller shaft, a transporting roller which displaces the sheet, an auxiliary shaft transmitting the motion from the second shaft to the transporting roller, a pinion mounted on the said second shaft, a pinion mounted on the auxiliary shaft and a variable speed gearing interposed between said pinions and consisting of a disk carrying trains of gears of different ratios, which can be rotated in such a manner that the first wheel of each train is in gear with the pinion mounted on the second shaft, while the last wheel meshes with the pinion carried by the auxiliary shaft.

In testimony whereof, I have signed my name to this specification in the presence of two subscribing witnesses.

FRANCESCO SPALAZZI.

Witnesses:
 LETTINI LABOUETTA,
 RENATO SCIVOLA.